(12) United States Patent
Burkhardt et al.

(10) Patent No.: US 10,462,542 B2
(45) Date of Patent: Oct. 29, 2019

(54) METHOD FOR DATA TRANSMISSION BY MEANS OF AN ABSOLUTE POSITION MEASUREMENT SYSTEM, ABSOLUTE POSITION MEASUREMENT SYSTEM AND COMPUTING DEVICE

(71) Applicant: Balluff GmbH, Neuhausen a.d.F. (DE)

(72) Inventors: Thomas Burkhardt, Zell (DE); Ralph Bauer, Kirchheim / Neckar (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 16/076,417

(22) PCT Filed: Feb. 9, 2016

(86) PCT No.: PCT/DE2016/100058
§ 371 (c)(1),
(2) Date: Aug. 8, 2018

(87) PCT Pub. No.: WO2017/137020
PCT Pub. Date: Aug. 17, 2017

(65) Prior Publication Data
US 2019/0058931 A1    Feb. 21, 2019

(51) Int. Cl.
*H04Q 9/14* (2006.01)
*G01D 5/245* (2006.01)
*H04Q 9/00* (2006.01)

(52) U.S. Cl.
CPC ............. *H04Q 9/14* (2013.01); *G01D 5/2455* (2013.01); *G01D 5/2451* (2013.01); *G01D 5/2454* (2013.01); *H04Q 9/00* (2013.01)

(58) Field of Classification Search
CPC .. G01D 5/2451; G01D 5/2454; G01D 5/2457; G01D 5/2455; G01D 5/2458; H04Q 9/00; H04Q 9/14
See application file for complete search history.

(56) References Cited

U.S. PATENT DOCUMENTS 5,506,577 A * 4/1996 Doyle ..................... E21B 47/12
340/870.01
6,434,516 B1 * 8/2002 Topmiller .............. G01D 5/244
702/198

(Continued)

FOREIGN PATENT DOCUMENTS

DE      92 12 302 U1    2/1993
DE     198 25 378 A1   12/1999

(Continued)

OTHER PUBLICATIONS

International Search Report of PCT/DE2016/100058, dated Oct. 12, 2016.

*Primary Examiner* — Franklin D Balseca
(74) *Attorney, Agent, or Firm* — Collard & Roe, P.C.

(57) ABSTRACT

In order to transmit data from an absolute position measurement system to an incremental interface, the transmission of an absolute position is carried out in a virtual reference journey of a position counter (cnt) via several phase-shifted electrical signals. During the virtual reference journey, at least one further information is transmitted in addition to the absolute position. For this purpose, a correspondingly designed absolute measurement system and a computing device are used, the computing device being designed to receive and evaluate data via an incremental interface.

15 Claims, 5 Drawing Sheets

(56) References Cited

U.S. PATENT DOCUMENTS

| | | | | |
|---|---|---|---|---|
| 6,757,635 | B2 * | 6/2004 | Topmiller | G01D 5/24452 |
| | | | | 324/207.13 |
| 7,244,929 | B2 | 7/2007 | Rodi | |
| 7,763,875 | B2 * | 7/2010 | Romanov | G01D 5/2495 |
| | | | | 250/208.1 |
| 9,160,365 | B2 * | 10/2015 | Gavin | H03M 13/09 |
| 9,654,393 | B2 * | 5/2017 | Braatz | H04L 45/72 |

FOREIGN PATENT DOCUMENTS

| | | | | |
|---|---|---|---|---|
| DE | 19825378 A1 * | 12/1999 | | G01B 7/003 |
| DE | 10 2004 045849 A1 | 3/2006 | | |

* cited by examiner

METHOD FOR DATA TRANSMISSION BY MEANS OF AN ABSOLUTE POSITION MEASUREMENT SYSTEM, ABSOLUTE POSITION MEASUREMENT SYSTEM AND COMPUTING DEVICE

CROSS REFERENCE TO RELATED APPLICATIONS

This application is the National Stage of PCT/DE2016/100058 filed on Feb. 9, 2016, the disclosure of which is incorporated by reference. The international application under PCT article 21(2) was not published in English.

The present invention relates to a method for data transmission of an absolute position measurement system to an incremental interface, a computer programme, which carries out steps of this method, and a machine-readable data carrier, which stores the computer programme. Furthermore, the present invention relates to an absolute position measurement system, which is configured to transmit data by means of the method. Finally, the present invention relates to a computing device, which is configured to receive and evaluate data by means of the method via an incremental interface.

PRIOR ART

Absolute position measurement systems normally use interfaces with which an absolute value can be transmitted. With digital serial interfaces, these are, for example, SSI, BiSS, IO-link or Drive-CliQ. The data are only serially transmitted upon a request by a control device and, therefore, are always present in a delayed manner. However, the absolute measured value of an absolute measurement system is available immediately after switching it on and thus can be retrieved upon request. However, such measurement systems require sensors that are substantially more laborious than incremental position measurement systems. The design of the interface is also more laborious than with incremental measurement systems.

Incremental position measurement systems use digital or analogue electrically phase-shifted A/B signals, which each represent the current position change. The measurement system emits the signals by itself. They do not have to be requested by a control device. Therefore, the position determined from these signals is available in the control device in real time. Incremental interfaces can be transmitted in an analogue manner via a sine and cosine signal. This is implemented in the 1Vpp interface, for example. Alternatively, a digital transmission can also take place by means of phase-shifted square-wave signals. This is realised in the HTL and RS422 interfaces, for example. When a control device not only requires a piece of information about a change of position, but also about an absolute position, then, firstly, a reference run to a clearly defined point is necessary for this. This is usually referred to as the reference position. After the point in time at which this position was reached, the control device knows the absolute position that is to be measured. Reaching the reference position is usually transmitted by a reference signal. In order to reach a reference point, a physical movement of the incremental measurement system is necessary. Incremental transmitters are designed to be substantially simpler in terms of construction than absolute position measurement systems. Incremental interfaces are also simple and cost-effective, in comparison to interfaces with which an absolute value can be transmitted, and are therefore very widespread.

In order to be able to connect the advantages of an absolute position measurement system to those of an incremental interface, U.S. Pat. No. 6,434,516 B1 proposes measuring a position by means of an absolute position measurement system, though not transmitting this as an absolute value on request. Instead, position changes are still converted into incremental signals in the absolute position measurement system and transmitted to an incremental interface. In order to transmit the absolute position, a reference run is carried out analogously to the process when using an incremental position measurement system. However, since the absolute position is already known, a physical reference run is not necessary. If, for example on several axes along which position measurement systems can be shifted, as is the case with robots, for example, an absolute position has to be transmitted, then this does not need to be taken into consideration, since no physical movement has taken place. There is also no energy requirement for a physical reference run. In particular with position measurement systems of large solar fields, this is important since here only a small part of the reflectors can ever be moved because of the power demand of the drives.

Instead of the physical reference run, a virtual reference run is carried out. Here, firstly a reference impulse and then A/B signals, which are generated by the absolute position measurement system because of the known absolute position, are emitted to the incremental interface. This takes place with the maximum possible speed, i.e. the minimum possible flank distance of the signals, such that the virtual reference run can be completed more quickly than a physical reference run. This saving of time has the advantage that, with solar fields, for example, all reflectors can carry out a virtual reference run simultaneously. Thus, the position measurement systems of the reflectors can be switched off overnight. Nevertheless, the whole field is referenced in the morning within seconds.

This combination of an absolute position measurement system and an incremental interface can only carry out a reliable position transmission when the minimum flank distance of the A/B signals generated by the absolute measurement system matches the minimum flank distance, which can be evaluated by the incremental interface. While an advantage of this method consists in that the absolute position measurement system can also be used with incremental interfaces, which were not originally provided for the data exchange with absolute position measurement systems, this also poses the danger that systems that do not match each other are combined with one another and thus increments are lost during data transmission. This can lead to position deviations. In order to transmit additional information about the absolute position measurement system, by means of which such errors could be detected ahead of time, additional interfaces would be necessary.

It is therefore the object of the present invention to provide a method for data transmission by means of an absolute position measurement system with which it can be detected whether the minimum flank distance of the incremental data, which are transmitted by the absolute position measurement system, matches an incremental interface, which receives the data. A further object of the invention consists in creating an opportunity to transmit information about the absolute position measurement system to a computing device without yet another interface having to be provided along with the incremental interface to do so. Further objects of the invention consist in providing an absolute position measurement system and a computing device for use with this method.

DISCLOSURE OF THE INVENTION

In one aspect of the invention, these objects are solved by a method for data transmission from an absolute position measurement system to an incremental interface, in which an absolute position in a virtual reference run of a position counter is transmitted via several phase-shifted electrical signals. The phase-shifted electrical signals are, in particular, two A/B signals that are phase-shifted relative to each other by 90°, and a reference signal. In addition to the absolute position, at least one further piece of information is transmitted during the virtual reference run. This further piece of information can be used in order to ensure a secure data transmission between the absolute position measurement system and the incremental interface and/or in order to transmit information about the absolute position measurement system to a computing device by means of the incremental interface.

This method is based on the understanding that, for the virtual reference run to end successfully, it must only be ensured that the position counter reaches a predetermined end value. It is, however, not necessary that adding up the increments transmitted by the absolute position measurement system in the position counter to form an end value take place in a linear manner. Instead, the speed of the data transmission can be varied, and even reversing the direction of the position counter many times is possible without this negatively affecting the absolute position transmission by means of the virtual reference run. Thus, by targeted variation of the virtual reference run, further information can be transmitted along with the absolute position. Should an absolute position measuring system try to transmit further information about an incremental interface along with the absolute position to a computing device by means of the method, said computing device not being set up for the evaluation of this information, then this would be harmless since the end state of the position counter in the method according to the invention does not change in comparison to a conventional virtual reference run. Variations in the speed or direction of a change of the count of the position counter would then simply be ignored in a conventional evaluation of the virtual reference run.

In order to be able to reliably recognise the end of the reference run, it is preferred that a change of the position counter takes place during the virtual reference run with a speed which is above a threshold value that can be predetermined, and a change of the position counter, which represents a change of the absolute position, i.e. which takes place when the virtual reference run has ended, takes place with a speed which maximally corresponds to the threshold value. Here, speed is to be understood as the number of transmitted increments per time unit. The smaller the flank distance of the increments, the greater the speed therefore is. By suitably choosing the threshold value, when monitoring the position counter, it can be distinguished in a computing device whether increments transmitted by the absolute position measurement system are still part of a virtual reference run or whether the virtual reference run has already ended, and the transmitted increments represent a change in position in comparison to the position transmitted in the virtual reference run.

In an embodiment of the method according to the invention, an end of the information transmission can be reported to a computing device via an output of the position measurement system which is set up to do so. However, this requires the provision of a further output, yet it enables the time point, at which an information transmission ends, to be transmitted independently of the end time point of the virtual reference run. This is advantageous, for example, when the whole time period of the virtual reference run is not to be used for the transmission of further information.

In a further embodiment of the method according to the invention, an end of the information transmission is recognised when a predeterminable maximum temporal length of the reference run has been reached. This maximum temporal length is stored in a computing device for this purpose.

The information is transmitted as a number, in particular, which can be encoded in the virtual reference run. This number can be used, for example, in its original form as a hexadecimal or as a binary number, as well as a resulting decimal number. If a piece of information expressed in letters, such as an order code of the absolute position measurement system, for example, is to be transmitted, then this must firstly be converted into a number for this purpose. This can take place, in particular, by means of a character table, such as the ASCII character table, for example.

When several data values are to be transmitted by means of the method, it is thus preferred that the number is obtained by the data values to the transmitted being expressed as binary numbers and then joined to one another. The generally quite large number obtained in this way can be transferred in one single data transmission process. When the number format to be expected is stored in a computing device, which evaluates this number, then the number can again be depicted there as a binary number and broken down into its components in order to recover the individual pieces of information.

Alternatively, it is also possible to transmit each piece of information as a separate number. To do so, it is described below how a distinguishability of several numbers transmitted during the virtual reference run can be ensured.

A possibility for the transmission of a number during the virtual reference run consists in that the number is read as a value of the position counter at the point in time of a change of direction of the position counter. A change of direction is here to be understood that a previous increase of the sum of the increments ends and the sum decreases, or a renewed increase of the position counter takes place after a previous reduction. A temporary stagnation of the position counter is also understood as the change of direction. In a conventional virtual reference run, an increase of the position counter takes place exclusively from its start to its end. Only after the virtual reference run has finished, it can no longer further increase, but also drop off in order to depict a change of position in both measurable directions. In the method according to the invention, a change of direction of the position counter during the virtual reference run can be generated by the virtual reference run being modified in such a way that increments are already transmitted temporarily during the virtual reference run, said increments not corresponding to a position change, starting from a reference position into a direction predetermined for the reference run, but also in the opposite direction.

Alternatively or additionally, the number can be read as the difference between a value of the position counter at the time point of a first change of direction and a value at the time point of an immediately subsequent second change of direction of the position counter. This is particularly advantageous when a further number is to be transmitted after a number that has already been transmitted, said further number being able to be transmitted more quickly via the difference than via the new absolute value of the position counter to be reached.

A possibility to ensure by means of the information transmission that the minimum flank distance of the absolute position measurement system is consistent with that of the incremental interface consists in a preferred embodiment of the method in that at least two predeterminable values can be transmitted. A computing device connected to the incremental interface then checks the transmitted predeterminable values as to whether they match the fixed predetermination.

In order to ensure by means of the information transmission that the minimum flank distance of the absolute position measurement system is consistent with that of the incremental interface, a cyclical redundancy check (CRC) can be used in a different preferred embodiment of the method. Here, at least one CRC determination number and a CRC value of each CRC determination number are transmitted. A computing device connected to the incremental interface checks the transmitted CRC determination number by means of the CRC value. The CRC determination number can only be predetermined and transmitted for the purpose of this check. Alternatively, a number that is to be transmitted to the incremental interface in any case and that represents a piece of information about the absolute position measurement system, for example, can also be used as the CRC determination value. When several numbers are to be transmitted in this way and a CRC value is transmitted in relation to each of these numbers, then this enables a redundant check.

If several numbers are to be transmitted, for example in order to pass on further information about the absolute position measurement system to the incremental interface, then it can alternatively also be provided that a CRC value of a sum of the transmitted numbers is transmitted. The computing device connected to the incremental interface then checks the transmitted numbers by means of the CRC value. In doing so, the transmission of an individual CRC value for each transmitted number is no longer necessary, such that a temporal extension of the virtual reference run as a result of the transmission of several CRC values is avoided.

When the check by means of the CRC value runs positively, then it can be recognised that the minimum flank distance of the position measurement system is correctly evaluated. Since the virtual reference run is usually carried out with the maximum possible speed, it can be assumed that the minimum flank distances of the absolute position measurement system and the incremental interface adapt to one another in the event of a correct data transmission during the virtual reference run and also that no increment can become lost during transmission to the incremental interface in the later operation of the absolute position measurement system. In this respect, the virtual reference run represents a worst-case scenario for the data transmission between the absolute position measurement system and the incremental interface.

A further preferred possibility to check by means of the method according to the invention whether the minimum flank distance of the absolute position measurement system is consistent with that of the incremental interface consists in that a position test run is carried out during the virtual reference run. Herein, a first value of the position counter is started with a first speed, and the position counter is then returned to a second value with a second speed, which differs from the first speed. This position test run is repeated several times in a row. It can be recognised that the minimum flank distance of the position measurement system is correctly evaluated when the first values and the second values, which are detected by the incremental interface, are identical in each position test run.

In an embodiment of the method according to the invention, the transmission of the at least one further piece of information takes place when the position measurement system is switched on. The absolute position measurement system thus behaves like an incremental position measurement system, which automatically carries out a reference run after it has been switched on. Here, information that can be predetermined in principle in each reference run in the absolute position measurement system is transmitted.

In an alternative embodiment of the method according to the invention, the transmission of the at least one piece of further information only takes place within the virtual reference run when the position measurement system obtains a request for an input set up for this. If such an input is present, this enables the information transmission to only be carried out as requested during the virtual reference run. This is generally only necessary once after the installation of the system or when components of the system have been exchanged. By a request for information no longer being needed in the event of later restarts of the absolute position measurement system, an unnecessary temporal extension of the virtual reference run can be avoided by the information transfer.

In a further aspect of the invention, the objects mentioned above are solved by an absolute position measurement system that is configured to transmit data by means of the method according to the invention. Absolute position measurement systems that can transmit incremental data have a computing module, for example in the form of a microchip, which converts the absolute position information into incremental data. This computing module is also responsible for the generation of the virtual reference run. In the absolute position measurement system according to the invention, the computing module implements steps of the method according to the invention, in order to transmit at least one piece of further information during the virtual reference run.

In yet another aspect of the invention, the objects mentioned above are solved by a computing device that is configured to receive and evaluate data via an incremental interface by means of the method according to the invention. Conventional computing devices, which are connected to an incremental interface, add up the received increments in a position counter and only evaluate the count at the end of a reference run as the first available absolute position. Here, it is irrelevant whether it is a physical reference run or a virtual reference run. The computing device according to the invention furthermore evaluates the course of the position counter during a virtual reference run in order to thus read information transmitted by the absolute position measurement system in addition to the absolute position.

In yet a further aspect of the invention, the objects mentioned above are solved by a computer programme that carries out the steps of the method according to the invention. It enables the implementation of the method in a conventional absolute position measurement system or on a conventional computing device in order to obtain the absolute position measurement system or computing device according to the invention, without undertaking constructive changes to this. To do so, the computer programme can be stored on a machine-readable data carrier.

BRIEF DESCRIPTION OF THE DRAWINGS

Exemplary embodiments of the invention are depicted in the drawings and are explained in more detail in the description below.

FIG. 2 shows the temporal course of a position counter in a diagram during the virtual reference run of an absolute position measurement system, which is switched on in stand-by.

EXEMPLARY EMBODIMENTS OF THE INVENTION

Figure 1:
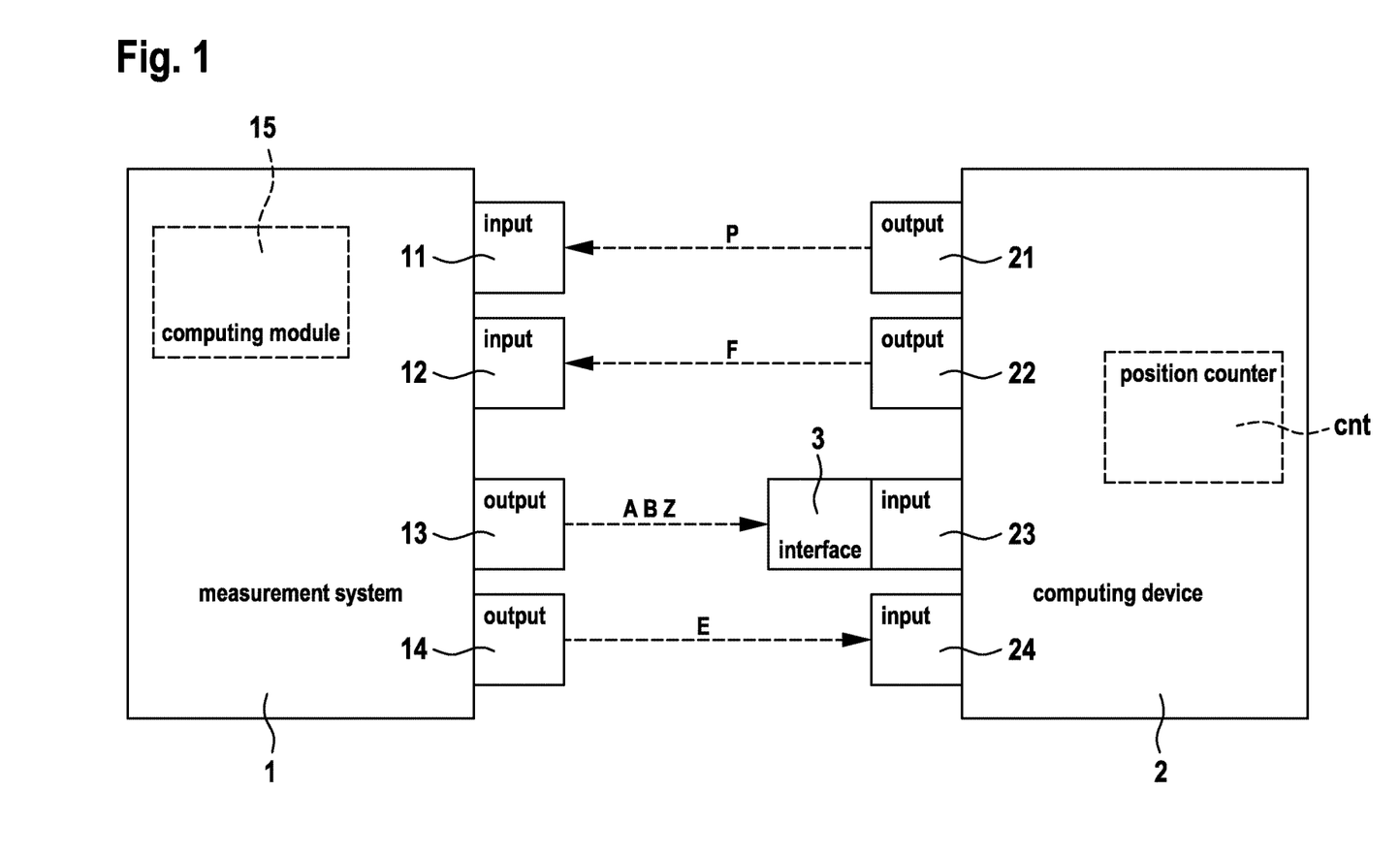
FIG. 1 schematically shows an absolute position measurement system, a computing device and an incremental interface that can be operated by means of a method according to an exemplary embodiment of the invention.

An absolute position measurement system 1, which can transmit data by means of several exemplary embodiments of the method according to the invention described below, is schematically depicted in FIG. 1. It has two inputs 11, 12 and two outputs 13, 14. A computing module 15 in the absolute position measurement system 1 is configured by means of a computer programme to convert absolute position signals into incremental signals and to generate a virtual reference run.

The absolute position measurement system 1 is connected to an electronic computing device 2 via several data paths. This has two inputs outputs 21, 22 and two inputs 23, 24. The first input 23 is equipped with an incremental interface 3. A position counter cnt is implemented in the computing device 2 as a computer program. The first output 21 of the computing device 2 is configured to transmit an electrical power supply P to the first input 11 of the absolute position measurement system 1. The signal P of the electrical power supply can adopt the values zero (switched off) and one (switched on). The second output 22 of the computing device 2 is configured to pass a request F for information on to the second input 12 of the absolute position measurement system 1. The first input 23 of the computing device 2 is configured to receive incremental signals A, B, Z from the first output 13 of the absolute position measurement system 1 via its incremental interface 3. Here, the incremental signals A, B represent square-wave signals, which are phase-shifted by 90° relative to one another. The incremental signal Z is a reference impulse, which displays the start of a virtual reference run. The second input 24 of the computing device 2 is configured to receive a signal for an end E of an information transmission from the second output 14 of the absolute position measurement system 1.

Figure 2:
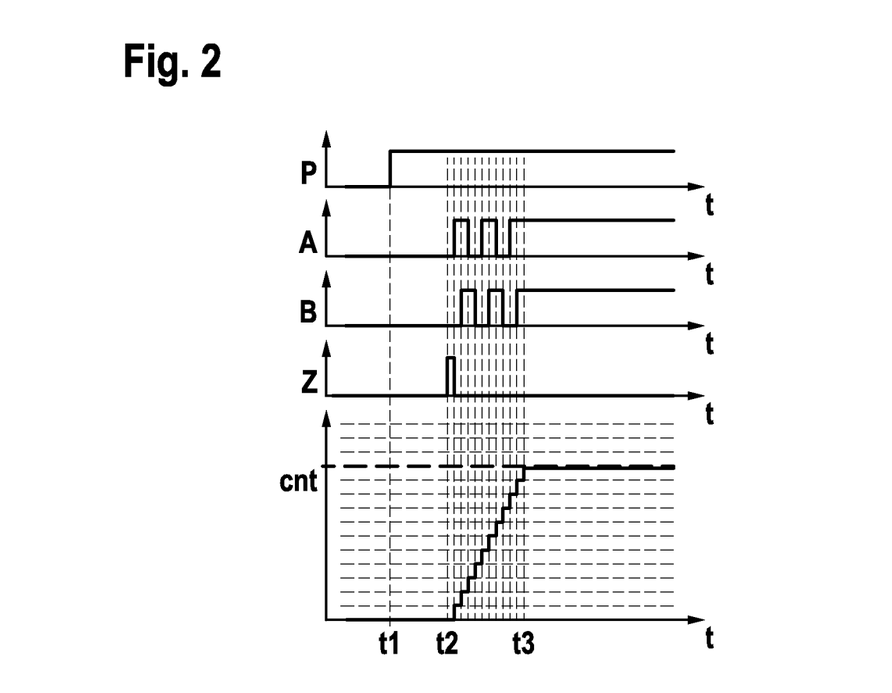

The duration of a conventional virtual reference run is depicted in FIG. 2 in the event that the absolute position measurement system 1 is not moving. At a time point t1, the power supply P is transmitted from the computing device 2 to the absolute position measurement system 1. As soon as this has ascertained its absolute position, it generates a reference impulse Z at a time point t2, which displays to the computing device 2 that all increments received below via the incremental interface 3 are to be added to the position counter cnt starting from a value of zero. Then, the absolute position measurement system 1 generates increments A, B of this length with the minimum possible flank distance and thus the maximum possible speed, which can be generated by the absolute position measurement system 1 and received by the incremental interface 3, until the position counter cnt has reached the absolute position ascertained by the absolute position measurement system 1.

Figure 3:
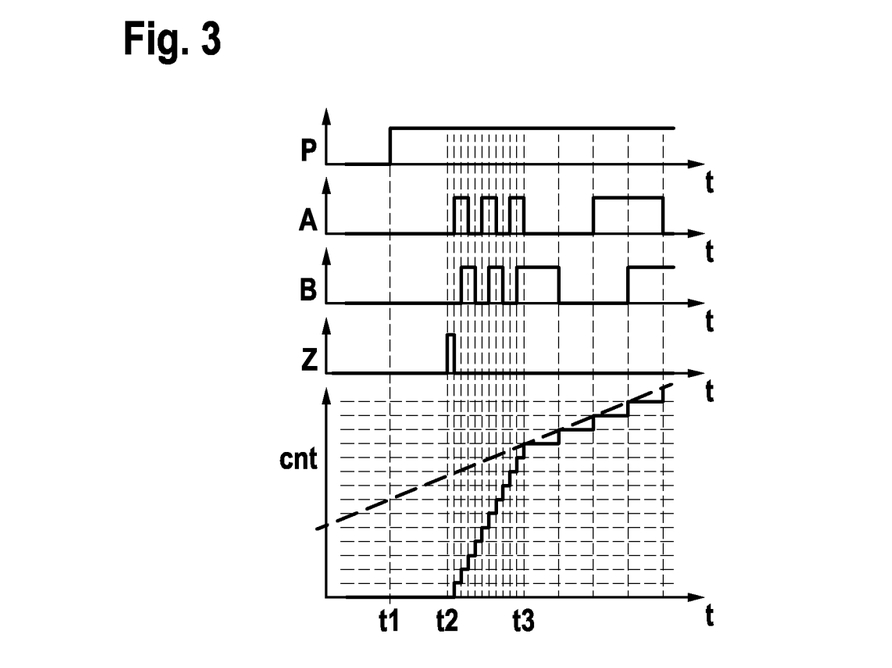
FIG. 3 shows, in a diagram, the temporal course of the position counter of an absolute position measurement system, which is switched on in a movement.

If the switching on of the absolute position measurement system 1 takes place when it is already moving, then the data transmission changes in the manner depicted in FIG. 3. The movement is depicted in FIG. 2 by a dotted line. As soon as the position counter cnt has reached this absolute position, the virtual reference run can be ended. In contrast to FIG. 2, the absolute position depicted by a dotted line is changed in the event of the moved absolute position measurement system as early as during the virtual reference run. The virtual reference run is then completed when the position currently measured by the absolute position measurement system 1 matches the sum of the transmitted increments A, B at a time point t3, and thus the value of the position counter cnt. Subsequently, the position determined from the A/B pulses complies with the physical position. By predetermining a suitable threshold value of the data transmission speed, the computing device 2 can recognise the end of the virtual reference run at the time point t3. When further information according to exemplary embodiments of the method according to the invention described below is transmitted during the virtual reference run between the time points t2 and t3, then the computing device 2 can recognise the end of the information transmission because the speed of the data transmission falls below the threshold value. Alternatively or additionally, an end E of the information transmission is reported by the second output 14 of the absolute position measurement system to the second input 24 of the computing device 2. Furthermore, the maximum possible time can alternatively be defined after which the virtual reference run is concluded at the latest. This corresponds to the maximum measuring length in increments multiplied by the flank distance.

Figure 4:
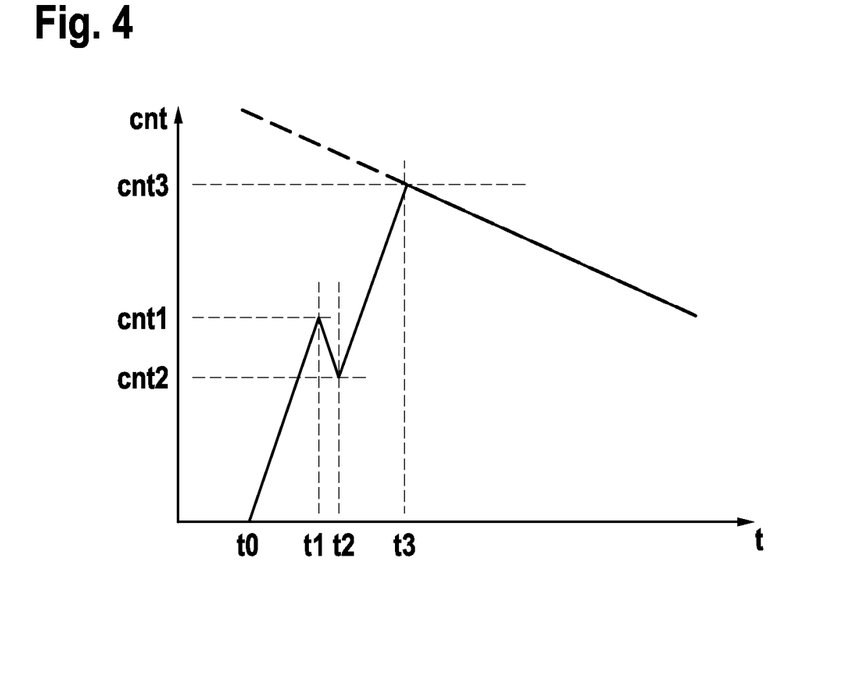
FIG. 4 shows the temporal course of a position counter, in a diagram, during a CRC-secured data transmission in an exemplary embodiment of the method according to the invention.

In order to check whether the minimum flank distance of the absolute position measurement system 1 is consistent with that of the incremental interface 3, it is provided in a first exemplary embodiment of the method according to the invention that only increments A, B of that length are transmitted with a positive sign until a predetermined first value cnt1 of the position counter cnt at a time point t1 is reached based on the start of the virtual reference run at a time point t0. Thereafter, it is returned to a predetermined second value cnt2. The two fixed values cnt1 and cnt2 can be checked in the computing device 2. When they match the predetermination, it can be assumed that no impulses have been lost. The flank distance has thus been correctly chosen. From the second time point t2, positive increments A, B are transmitted again until the position counter cnt has reached a value at a time point t3, which corresponds to the currently measured absolute position. This is depicted as a dotted line in FIG. 4 for an absolute position measurement system 1 in movement. Here, a return movement of the position measurement system 1 takes place, such that, from the time point t3, negative increments A,B are transmitted again, and the value of the position counter cnt falls. In the computing device 2, the first value cnt1 is recognised by a computer programme by means of the change of direction of the position counter cnt as the defined number. Furthermore, the renewed change of direction is detected at the time point t2 and the CRC value is calculated from the difference of the first value cnt1 and the second value cnt2. By comparing the CRC determination number to the CRC value, it is checked whether the data transmission has taken place during the virtual reference run without increments becoming lost. Should this check run negatively, then it is detected that the minimum flank distance of the absolute position measurement system 1, for example, is not consistent with that of the incremental interface 3.

Figure 5:
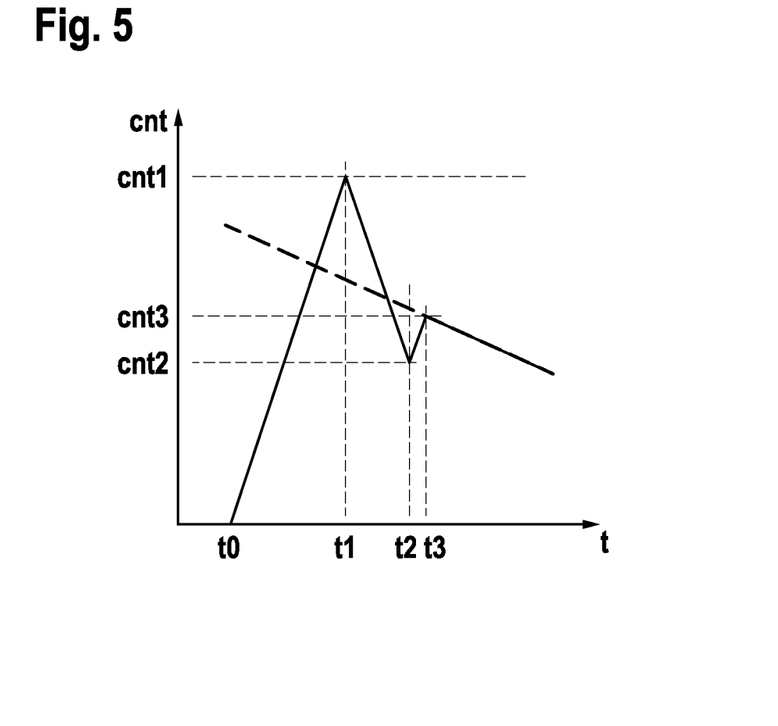
FIG. 5 shows the temporal course of a position counter, in a diagram, during an information transfer in an exemplary embodiment of the method according to the invention.

FIG. 5 shows a different exemplary embodiment of the method according to the invention in which, instead of the predetermined reference numbers, a number is calculated in which various pieces of information about the absolute position measurement system 1 are encoded. As in the first exemplary embodiment of the method according to the invention, this number is transmitted as value cnt1 during the virtual reference run. However, since it is very high, it is above the absolute position of the absolute position measurement system 1, which is depicted, in turn, as a dotted line. The CRC value of this number is transmitted in turn as the difference between the first value cnt1 and a second value cnt2, which is below the absolute position of the absolute position measurement system 1. After the time point t2 at which a renewed change of direction of the position counter cnt takes place, a third value cnt3 is started up to a time point t3 as the actual absolute position of the absolute position measurement system 1, and thus the virtual reference run ends.

Figure 6:
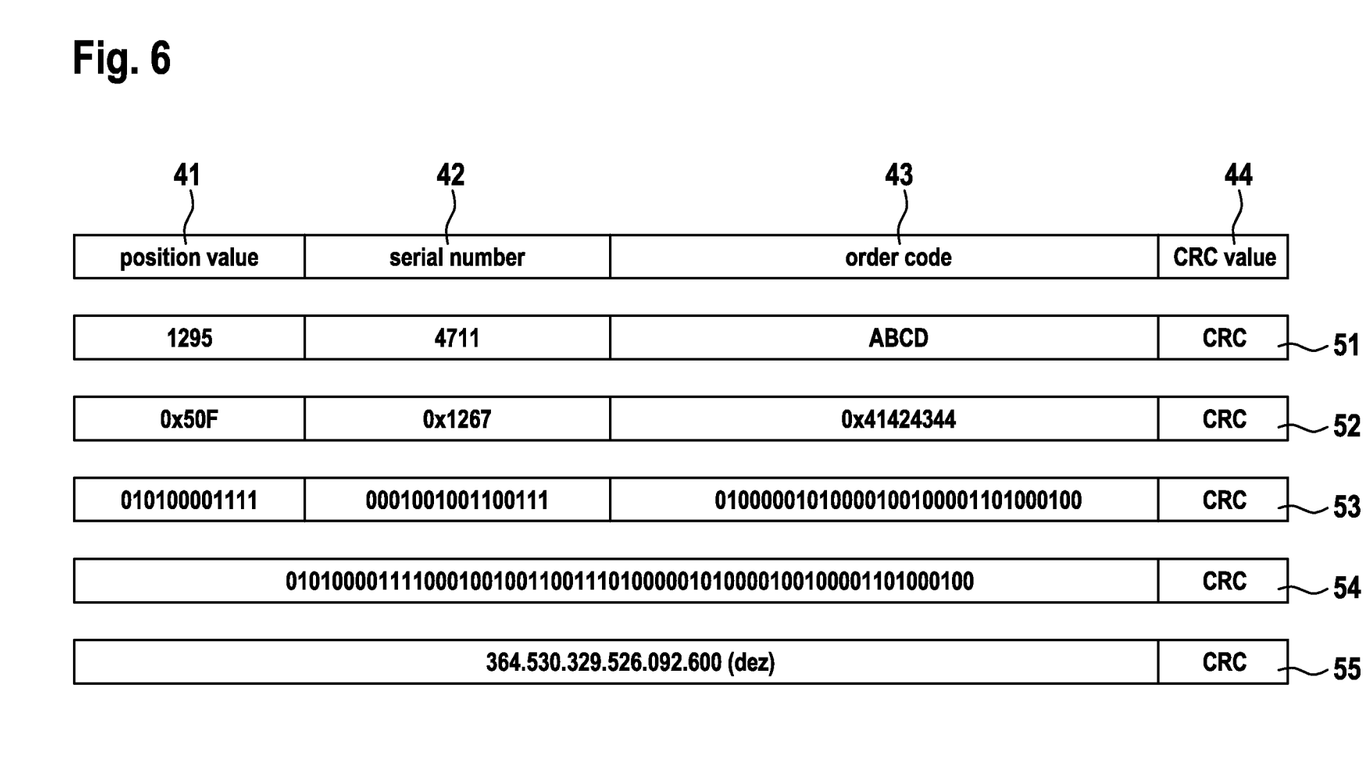
FIG. 6 shows in a table how several pieces of information in an exemplary embodiment of the method according to the invention can be combined in a single number.

The calculation of the first value cnt1 is depicted in FIG. 6. A position value 41, a serial number 42 and an order code 43 of the absolute position measurement system 1 are to be encoded in the number. Then, the CRC value 44 is to be transmitted. The information to be transmitted is depicted in row 51. As shown in row 52, it is firstly respectively converted into a hexadecimal number and then, as shown in row 53, into a binary number. The binary numbers are joined together, such that a large binary number emerges, which is shown in row 54. As depicted in row 55, this can be converted again into a decimal number, which corresponds to the first value cnt1. For this large number, the corresponding CRC number is then calculated, and the information is transmitted to the computing unit 2 via the incremental interface 3 during the virtual reference run. This can, in turn, check from the high transmitted number and the corresponding CRC number whether all increments have been correctly transmitted. Moreover, it can convert the first value cnt1 from a decimal number into a binary number once again and separate this into several partial values. By the computing step of the table according to FIG. 6 being carried out from the bottom to top, the computing device 2 thus recovers the information encoded by the absolute position measurement system 1 in its computing module 15.

Figure 7:
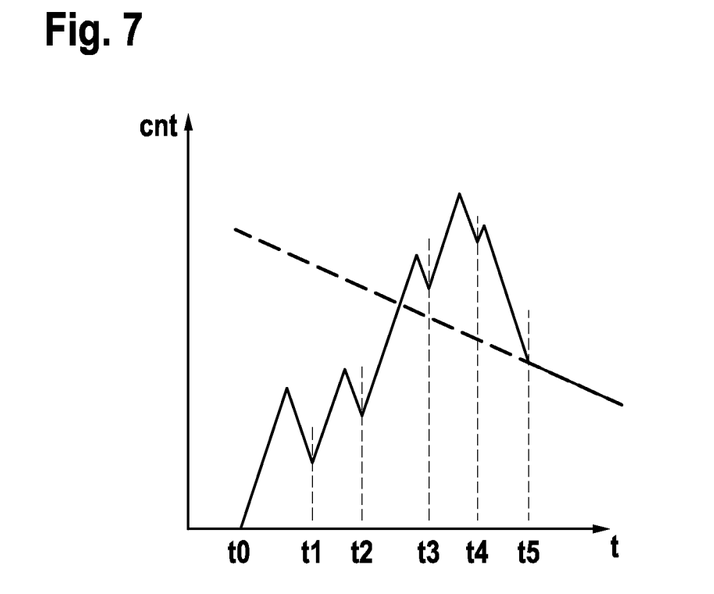
FIG. 7 shows the temporal course of the position counter in a diagram when several pieces of information are transmitted one after the other in an exemplary embodiment of the method according to the invention.

Instead of the binary number values of individual pieces of information to be transmitted, these can also be transmitted one after the other. As depicted in FIG. 7, a number cnt can be transmitted with each local maximum of the position counter cnt, said number representing a piece of information about the absolute position measurement system 1. When subsequently returning the position counter cnt to a local minimum at the time point t1, t2, t3 and t4, in each case a CRC value is transmitted for the number. Instead of a single high number, several small numbers can be transmitted in this way, which also speeds up the virtual reference run. Furthermore, a redundancy of the CRC insurance of the transmission is reached by each individual number being assigned its own CRC value. Between the time point t4 and t5, no additional information is further ascertained here. While the time point t4 characterises the end of the ascertaining of the final CRC value, the further course of the position counter cnt still only serves to move this at the time point t5 to the measured absolute position of the absolute measurement system 1.

When no redundancy of the CRC checking is desired, then an information transfer is also used in the manner depicted in FIG. 7 to transfer yet more information in a short amount of time. Here, the backwards movements of the position counter cnt also represent further information about the absolute position measurement system 1. Only the final backwards movement, which ends at the time point t4, then represents a CRC number, which can selectively be transmitted either as a CRC number of the last transferred value or as a CRC number of the sum of all transferred values. Both variants enable the computing device 2 to check whether the absolute position measurement system 1 can transmit data to the incremental interface 3 without error.

Figure 8:
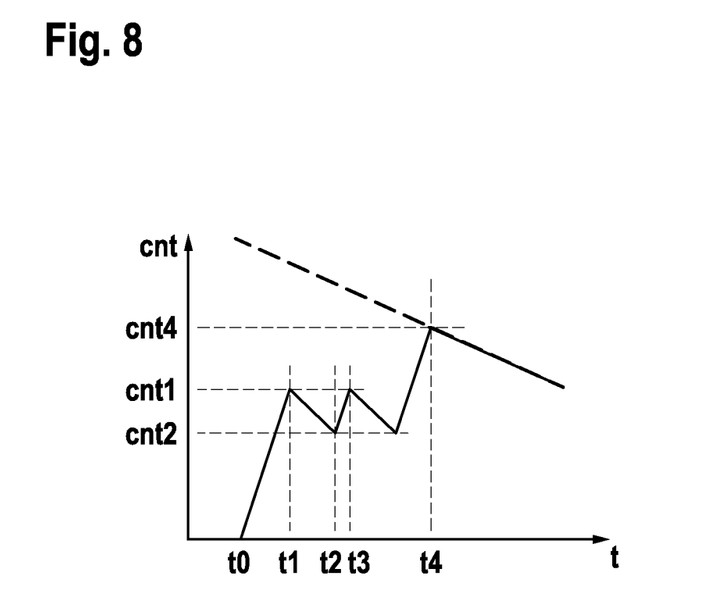
FIG. 8 shows, in a diagram, the temporal course of a position counter in an exemplary embodiment of the method according to the invention, in which the speed of the virtual reference run is changed.

In yet another exemplary embodiment of the method according to the invention, after the start of the virtual reference run at a time point to, a first value cnt1 of the position counter cnt, said value cnt1 being able to be freely predetermined, is started with a first speed. This is depicted in FIG. 8. After reaching this first value cnt1, a change of direction of the position counter cnt takes place at a time point t1 by transferring negative increments A, B, wherein the negative increments are transferred with a lower speed than the positive increments. When, at a time point t2, a second value cnt 2 is reached, a renewed change of direction takes place, and the first value cnt1 is, in turn, started with the first speed. After it has reached the point in time t3, another decrease of the position counter cnt to the second value cnt2 with the second speed and then an increase of the position counter cnt to a value cnt4 takes place at a time point t4, which corresponds to the absolute position of the absolute position measurement system 1 and thus ends the virtual reference run. When the computing device 2 recognises that the difference between the first value cnt1 and the second value cnt2 is identical both times, then is it concluded that no increments have gone missing during the data transmission from the absolute position measurement system 1 to the increment interface 3.

In two different embodiments of the method according to the invention it can either be provided that the further information, which is to be transferred in addition to the absolute position, is transferred each time after switching on the electrical power supply or that it can only be transferred when the absolute position measurement system 1 receives a request F for this via its second input 12. These two embodiments of the method according to the invention can be combined with all exemplary embodiments of the method according to the invention described above.

The invention claimed is:

1. A method for data transmission from an absolute position measurement system to an incremental interface, in which an absolute position in a virtual reference run of a position counter is transmitted via several phase-shifted electrical signals, wherein, during the virtual reference run, at least one piece of further information is transmitted in addition to the absolute position, wherein the at least one piece of further information is transmitted as a number, and wherein the number is read as a value of the position counter at a time point of a change of direction of the position counter.

2. The method according to claim 1, wherein a change of the position counter during the virtual reference run takes place with a speed which is above a predeterminable threshold value, and a change of the position counter, which represents a change of the absolute position, takes place with a speed which maximally corresponds to the threshold value.

3. The method according to claim 1, wherein an end of the data transmission is reported to a computing device via an output of the position measurement system which is set up for this purpose.

4. The method according to claim 1, wherein an end of the data transmission is detected when a predeterminable maximum temporal length of the virtual reference run has been reached.

5. The method according to claim 1, wherein the number is obtained by several data values to be transmitted being joined to one another as binary numbers.

6. The method according to claim 1, wherein at least two predeterminable values are transmitted, wherein a computing device connected to the incremental interface checks the at least two transmitted predeterminable values.

7. The method according to claim 6, wherein it is detected that a minimum flank distance of the position measurement system is correctly evaluated when the checking runs positively.

8. The method according to claim 1, wherein several numbers and a CRC value of a sum of the several numbers are transmitted wherein a computing device connected to the incremental interface checks the several numbers by means of the CRC value.

9. The method according to claim 1, wherein the transmission of the at least one piece of further information takes place when the position measurement system is switched on.

10. The method according to claim 1, wherein the transmission of the at least one piece of further information takes place within the virtual reference run when the position measurement system obtains a request about an input set up for this purpose.

11. A non-transitory computer-readable storage medium that stores a computer program comprising a set of computer readable instructions, which, when executed by a computer, carry out all steps of the method according to claim 1.

12. An absolute position measurement system, which is configured to transmit data by means of the method according to claim 1.

13. A computing device, which is configured to receive and evaluate data via an incremental interface by means of the method according to claim 1.

14. A method for data transmission from an absolute position measurement system to an incremental interface, in which an absolute position in a virtual reference run of a position counter is transmitted via several phase-shifted electrical signals, wherein, during the virtual reference run, at least one piece of further information is transmitted in addition to the absolute position, wherein the at least one piece of further information is transmitted as a number, and wherein the number is read as a difference between a value of the position counter at a time point of a first change of direction and a value at a time point of an immediately subsequent second change of direction of the position counter.

15. A method for data transmission from an absolute position measurement system to an incremental interface, in which an absolute position in a virtual reference run of a position counter is transmitted via several phase-shifted electrical signals, wherein, during the virtual reference run, at least one piece of further information is transmitted in addition to the absolute position, wherein, during the virtual reference run in a position test run, a first value of the position counter is started and the position counter is then returned to a second value with a second speed, wherein the position test run is repeated several times in a row, and wherein it is detected that a minimum flank distance of the position measurement system is correctly evaluated when the first value and the second value, which are determined by the incremental interface, are identical in each position test run.

* * * * *